July 24, 1956 W. GARROCK ET AL 2,755,839
APPARATUS FOR RE-FORMING TUBULAR MEMBERS
Filed July 5, 1952 6 Sheets-Sheet 4

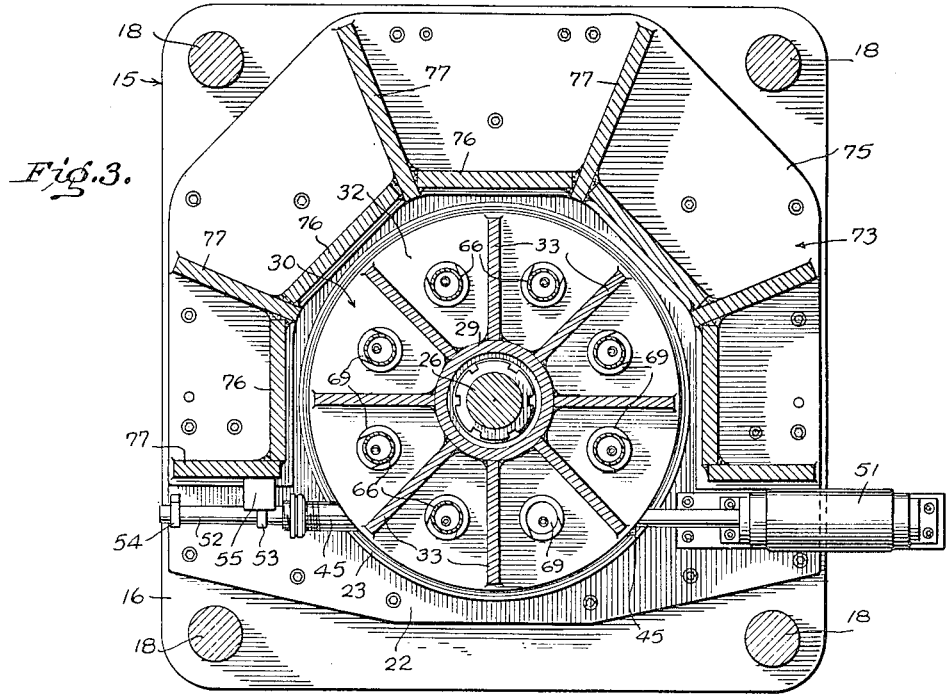
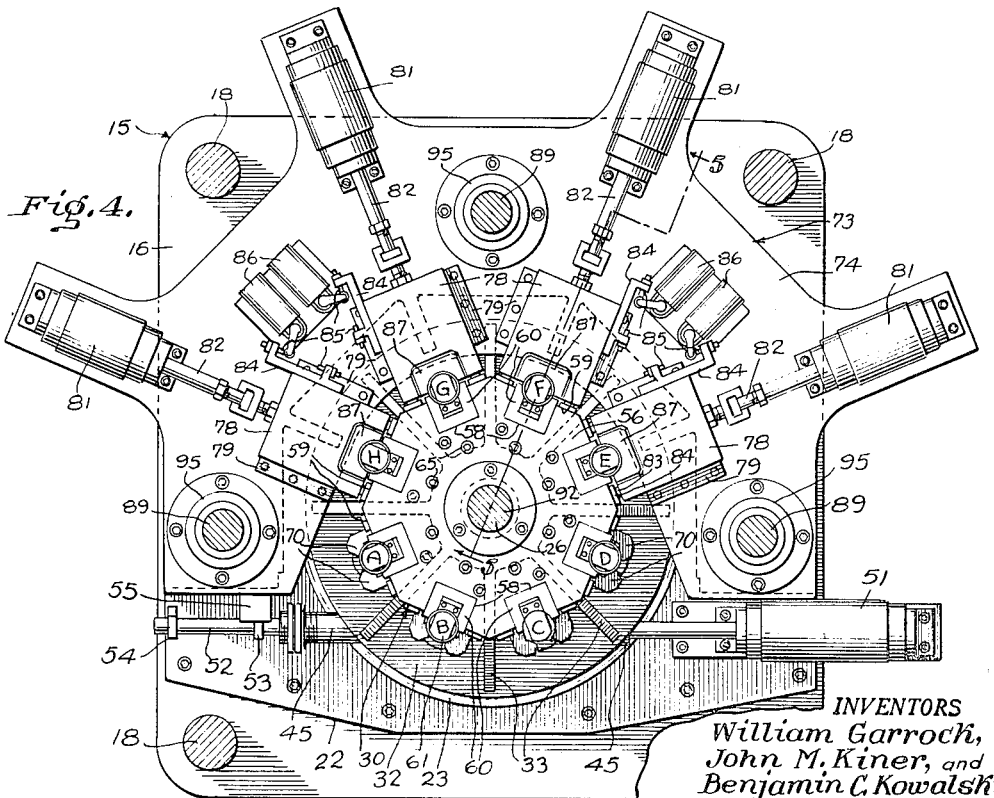

INVENTORS
William Garrock,
John M. Kiner, and
Benjamin C. Kowalski
BY Reginald W. Hoagland
ATTORNEY

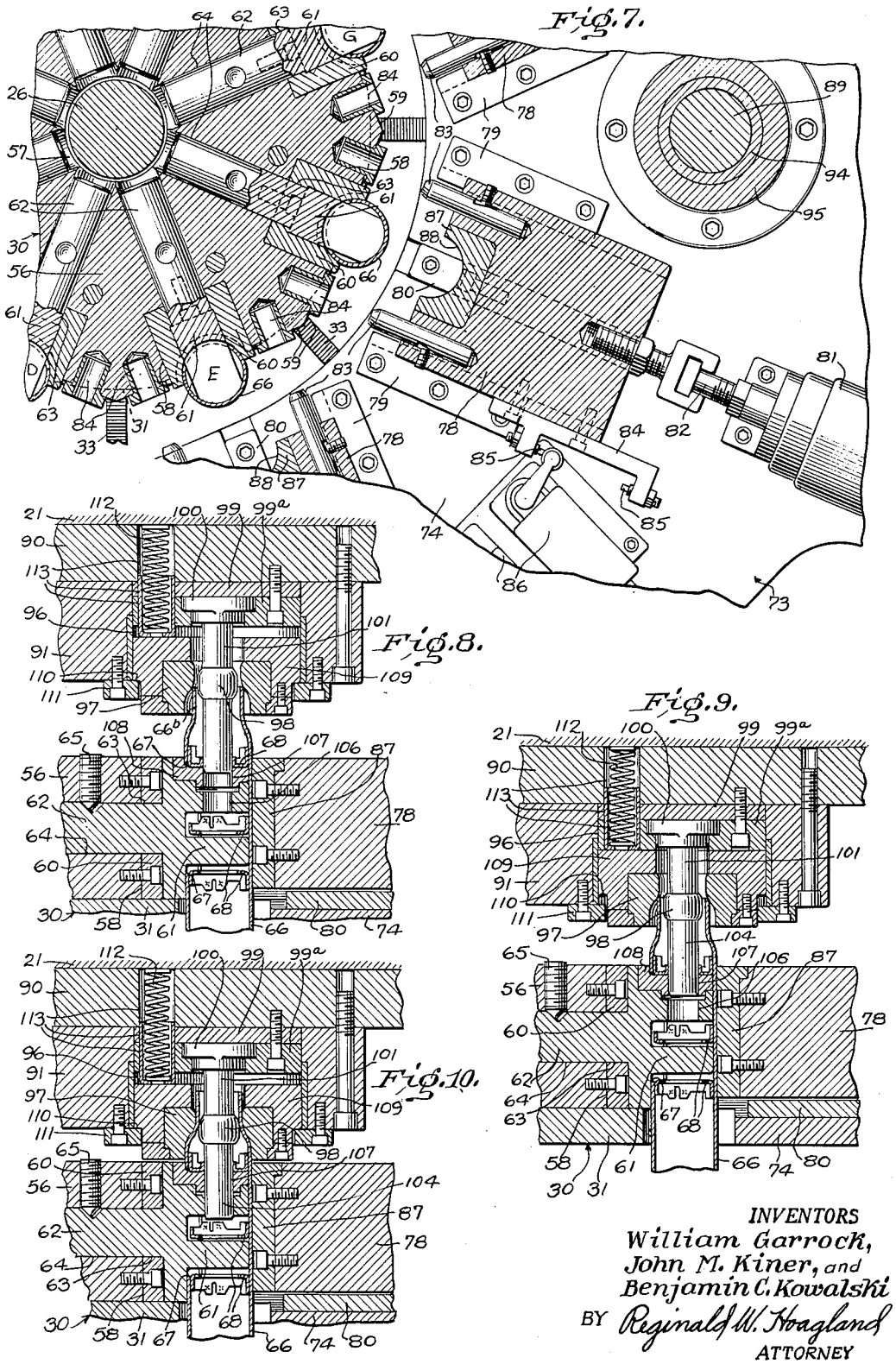

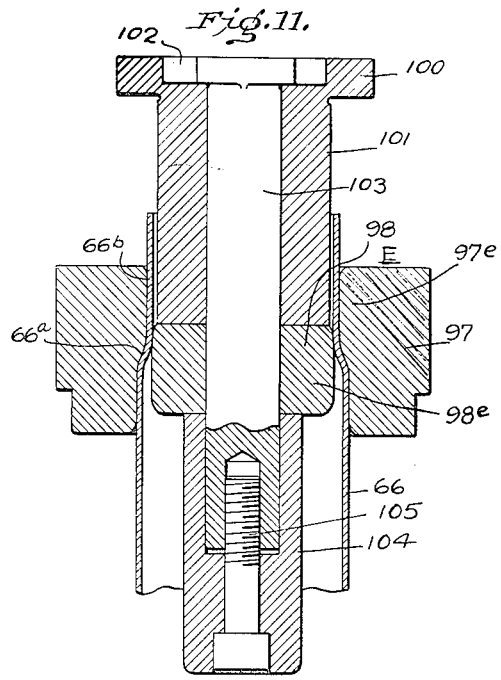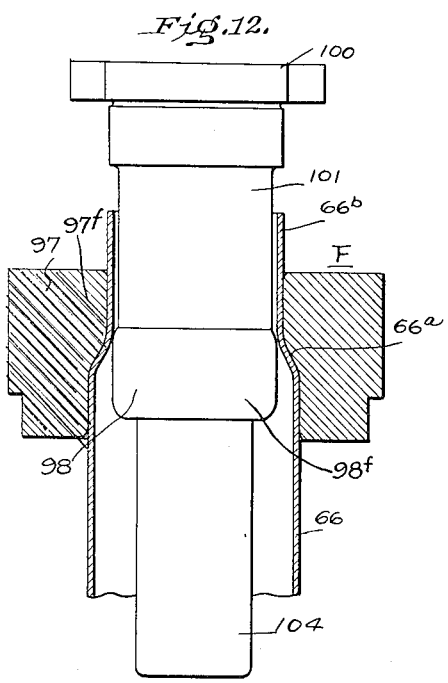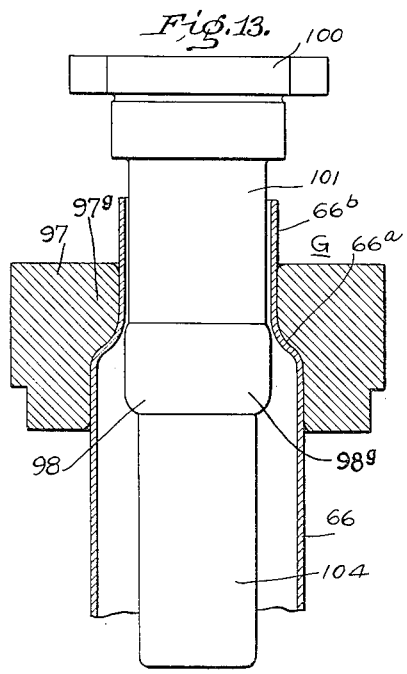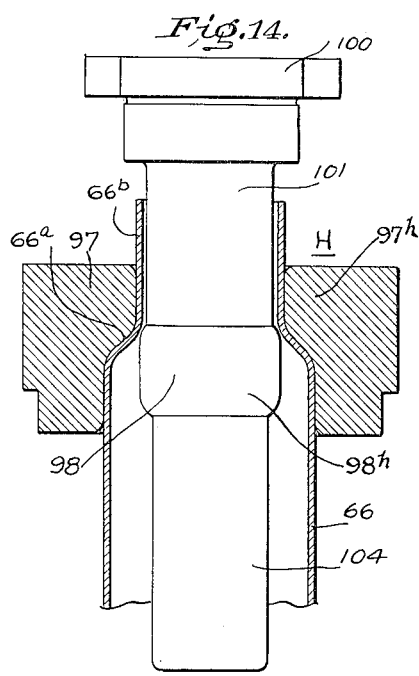
INVENTORS
William Garrock,
John M. Kiner, and
Benjamin C. Kowalski
BY Reginald W. Hoagland
ATTORNEY

United States Patent Office 2,755,839
Patented July 24, 1956

2,755,839
APPARATUS FOR RE-FORMING TUBULAR MEMBERS

William Garrock, Detroit, John M. Kiner, Dearborn, and Benjamin C. Kowalski, Ferndale, Mich., assignors to Ainsworth Manufacturing Corporation, Detroit, Mich., a corporation of Michigan Application July 5, 1952, Serial No. 297,338

7 Claims. (Cl. 153—25)

This invention relates to the re-formation of tubular members and refers more particularly to a method and means for necking in and forming to shape and size ends of tubular members and especially steering columns as used on motor vehicles.

Necking in operations to short tubular members that are open at both ends and throughout their lengths which permit the use of inner and outer forming dies do not offer as difficult a problem as do like operations to tubular members of considerable length or of constructions whereby access can only be gained to the interiors through the ends that are being reduced in diameter. While the present invention will perform the same high degree of necking in operation to both of the above-mentioned classes of articles, it is upon the last and most difficult class that the improved apparatus is especially adapted for use.

Heretofore, it has been a practice in the manufacture of cartridge casings which have a closed end to insert a mandrel in the open end of the casing and to contract the casing against the mandrel with a tapering die to form a neck portion on the casing. The purpose of the mandrel is to support and control the shaping of the neck and thereby prevent to a great extent waves, folds, or longitudinal wrinkles from being formed in the neck during forcing of the tapering die downward and over the end of the casing. The mandrel, having been provided by merely increasing the diameter of the shank of a casing stripping punch, remains stationary in the casing until the tapering die has been elevated to a position where it is free from the neck of the casing.

An object of the present invention is to provide a novel and improved method and means of reducing the diameters of the ends of tubular members to size and shape which include both a necking-in operation and a drawing operation.

Another object of the invention is to neck in an end of a tubular member behind the movement of an inner die with an outer die during feed-in movement of both dies and to position said dies relative to one another during return movement of both dies whereby said dies will constitute either a pair of ironing dies or a pair of drawing dies for working the material of the necked portion to shape and size.

Another object of the invention is to provide an apparatus for performing successive necking-in operations to the end of a tubular member which reduces by each operation the diameter of the portion being necked, and which irons from the wall of the necked portion all irregularities after each necking-in operation except in the final operation where said wall is drawn to size and shape.

A further object of the invention is to provide a machine that removably supports tubular members upon an intermittently rotating turret for moving each tubular member successively to operation stations at which are located suitable dies carried on a reciprocating press head that is lowered onto open ends of a plurality of the tubular members for simultaneously effecting the above-mentioned operations.

A still further object of the invention is the provision of a machine as set forth wherein additional supporting means in the form of clamping jaws are carried by and are movable on a stationary rigid structure at stations where operations to the tubular members are effected for engaging both the turret and the tubular members to rigidly support the tubular members while operations are being performed thereon.

It is also an object of the invention to provide a machine of the above-indicated character wherein the clamping jaws for supporting the tubular members act as locking elements to hold the turret against turning movement during the dwell periods of the turret and during the time intervals that the power source for effecting intermittent rotary motion to the turret is disengaged from the turret and is returning to position for another power stroke to turn the turret to the next station.

With the above and other objects and advantages in view, the invention consists of combinations and general assemblage to be hereinafter enlarged upon and pointed out in the appended claims.

The invention is illustrated in the accompanying drawings, wherein:

Figure 3 is a horizontal section taken on line 3—3 of Figure 1;

Figure 4 is also a horizontal section and is on line 4—4 of Figure 1;

Figure 7 is a horizontal section on line 7—7 of Figure 5 with clamps retracted;

Figures 5, 6:
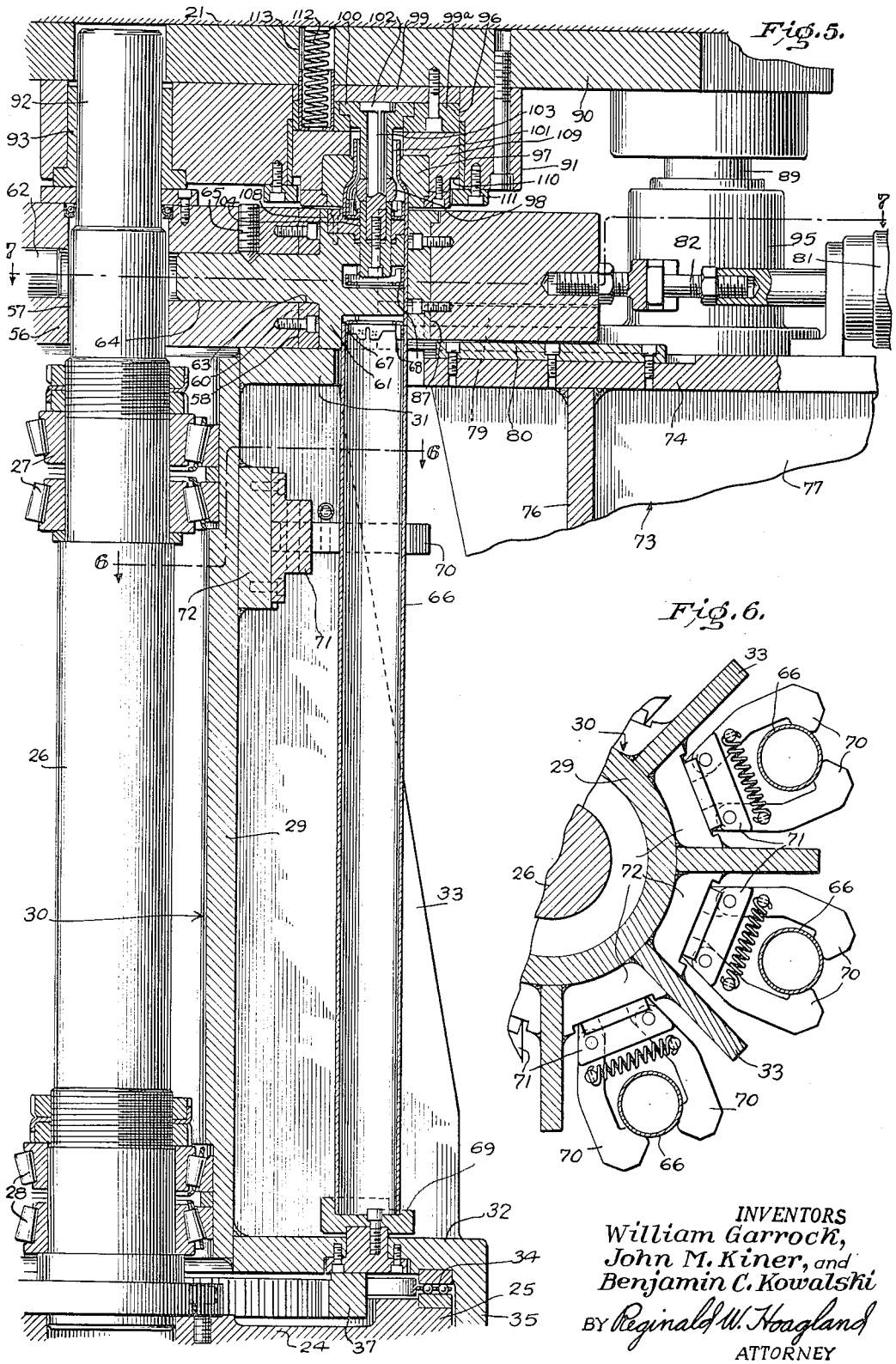
Figure 5 is an enlarged fragmentary vertical section taken substantially on line 5—5 of Figure 4.
Figure 6 is a detail section on line 6—6 of Figure 5.

Figures 8, 9, and 10 are sectional views of a portion of the structure as illustrated in Figure 5, showing the same parts in different positions; and Figures 11, 12, 13, and 14 are sectional views showing the dies and work performed thereby at the different stations to completely neck in a tubular member.

Figure 1:
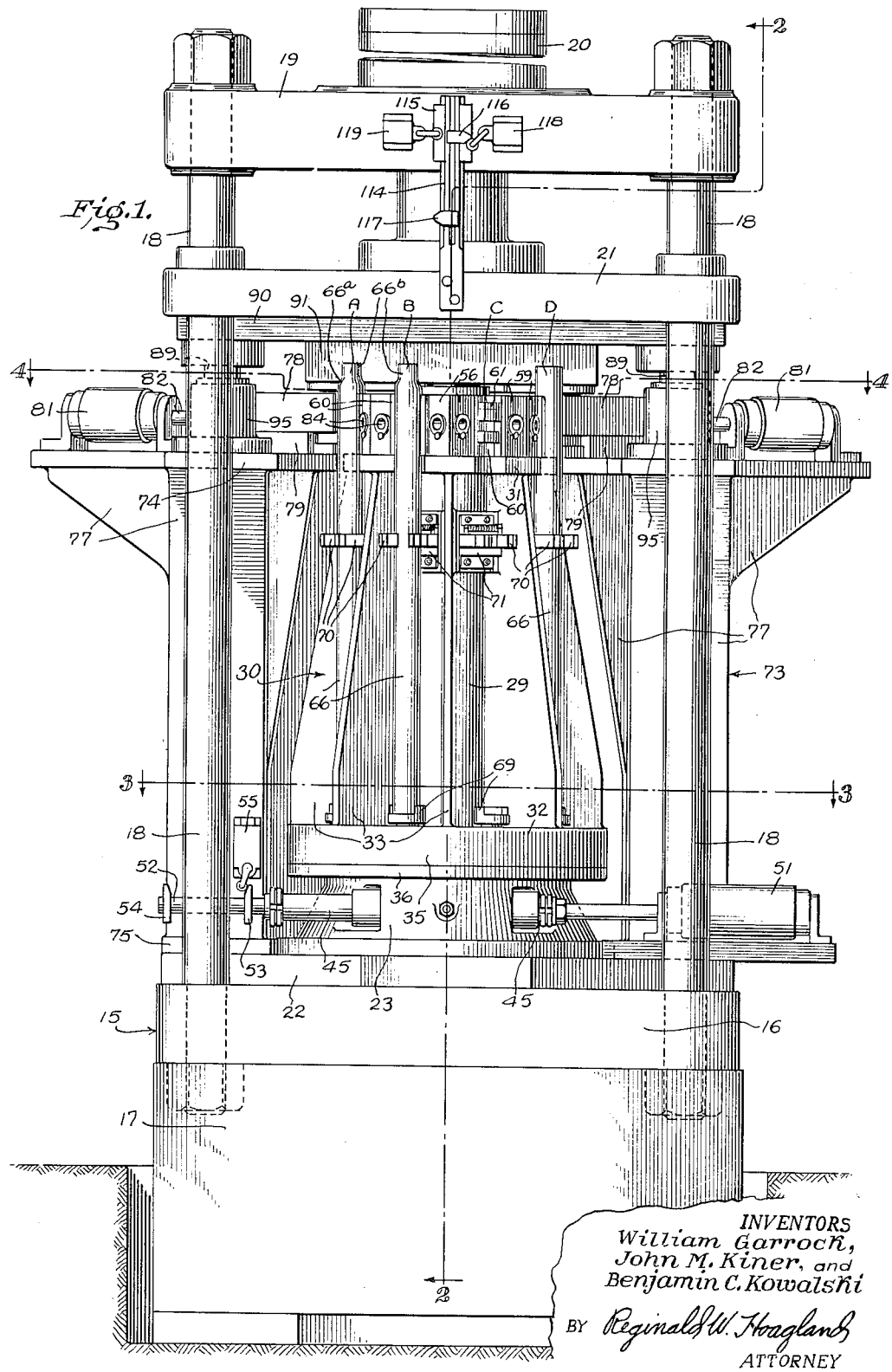
Figure 1 is a front elevation of a machine embodying the invention.
Figure 2:
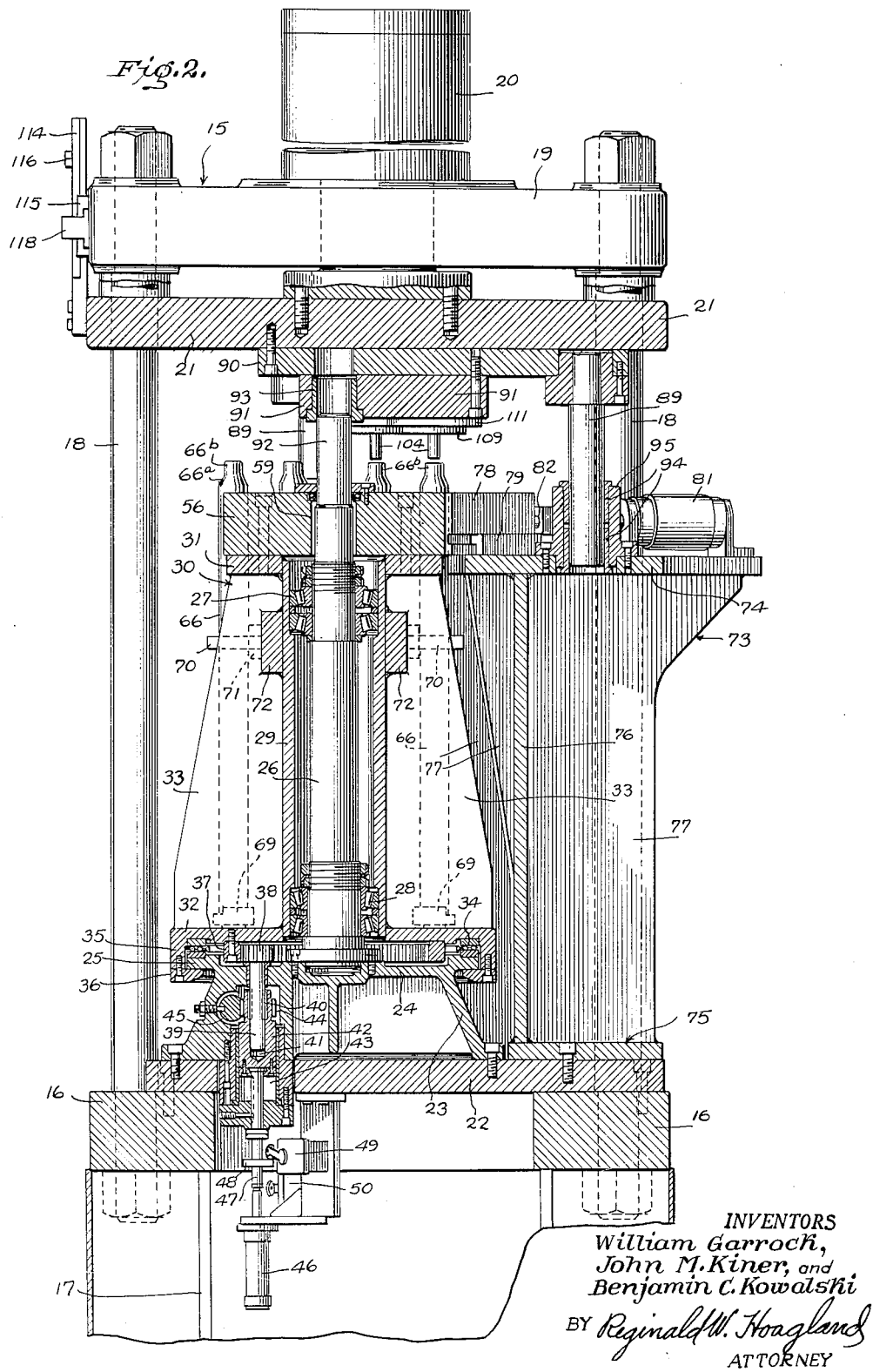
Figure 2 is a vertical section and side elevation taken on line 2—2 of Figure 1.

Referring now more specifically to the drawings and especially to Figures 1 and 2, there is shown and designated generally by the numeral 15 a simple form of hydraulic press which consists mainly of a bed 16 mounted upon a sub-structure 17 and supporting thereabove by a plurality of pillars 18 a superstructure 19 on which is mounted a hydraulic power unit 20 that vertically reciprocates a ram 21 slidable on the pillars 18.

Bolted to and resting on the upper surface of the bed 16 is a base plate 22 which in turn rigidly supports a circular base frame 23 provided with a slightly elevated top wall 24 and an outwardly directed annular flange 25 substantially on the same horizontal plane as that of the top wall 24. Fixed to the top wall 24 at the center thereof is the lower end of a vertically arranged rigid post 26 which has mounted thereon at spaced locations the inner races of a pair of upper and a pair of lower cone bearings 27 and 28, respectively, which are positioned in the opposite ends of a vertically arranged cylindrical hub portion 29 of a turret generally indicated by the numeral 30.

The cylindrical hub portion 29 envelops and rotates around the major and lower portion of the post 26 and is a part of the turret frame structure which also includes outwardly directed annular flanges 31 and 32 on the upper and lower ends of said cylindrical hub portion and a plurality of vertically and radially extending reinforcing webs 33 joined to said cylindrical hub and to both of said flanges. Between the lower flange 32 of the turret frame structure and the flange 25 of the base frame 23 and adjacent their peripheral edges is a thrust bearing 34 which is enclosed by a depending annular edge 35 of the flange 32 and a ring gib 36 bolted to the undersurface of said edge 35 and rotatably engaging under the flange 25.

For intermittently rotating the turret 30 around the post 26, a ring gear 37 is attached to the underside of the flange 32 and meshes at all times with a pinion 38 mounted on the upper end of a vertical stub shaft 39 journaled in the top wall 24 of the base frame 23 and keyed, as at 40, in an axial recess 41 in a plunger 42 slidable in a vertical direction in a cylinder 43. On the upper portion of the plunger 42 outwardly of the cylinder 43 are gear teeth 44 which are adapted to be engaged with and disengaged from the teeth of a horizontally slidable rack bar 45 according to the position of the plunger in the cylinder, the position being controlled by a hydraulic motor 46 which is attached to the plunger by a connecting rod 47. On the rod 47 is adjustably fastened a switch actuator 48 that engages arms of switches 49 and 50 at opposite ends of the stroke of the plunger for a purpose to be set forth as the description proceeds. Both ends of the rack bar 45 protrude from the base frame 23, and to one end is connected a hydraulic motor 51 that operates the rack bar, and on the other end a reduced extension 52 is provided to which are adjustably attached switch dogs 53 and 54 that engage the arm of an electric switch 55 at opposite ends of the stroke of the rack bar for a purpose to be explained later. Thus, it can be seen that by controlling operation of the hydraulic motors 46 and 51, the gear teeth 44 on the plunger can be engaged with the teeth of the rack bar 45 during a stroke of the rack bar in one direction and disengaged from one another during movement of the rack bar in the opposite direction which will produce intermittent rotation of the turret 30 in a single direction. With the construction illustrated, there are eight separate movements and eight dwells during a complete revolution of the turret.

On the upper surface of the upper flange 31 of the turret frame structure and bolted thereto is a work-supporting block 56 which is shown as being substantially octagonal in plan and which has a central hole 57 therein through which the post 26 extends. The block 56 is notched inwardly, as at 58, at the eight faces 59 produced by the octagon shape thereof for the reception and attachment of U-shaped adaptors 60 into which are seated portions of interchangeable work-clamping jaws 61. The jaws 61 have relatively long, inwardly directed shanks 62 thereon which project through holes 63 in the bases of the adaptors 60 and into radial holes 64 in the block 56 where said shanks are engaged by set screws 65 threaded into said block for securing the jaws in seated positions in the adaptors 60.

In the process of manufacturing steering columns, as illustrated and designated by the numeral 66, for which the present invention is especially adapted, it is preferable if not essential that openings 67 in the walls of the tubular members for the projecting of transmission operating levers therethrough and the attachment of cross plates 68 within the tubular member for the support of structural parts be cared for prior to the necking in of the ends of the tubular members. Advantage is taken of such construction during the necking-in operation by extending the clamping jaws 61 through the openings 67 and into the tubular members to clamp against inner surfaces of the walls of the tubular members in supporting said tubular members. The particular type of steering column illustrated has one of its cross plates 68 arranged intermediate the ends of its opening 67, thus requiring forking of jaws 61 to bridge the plate in order to engage the wall both above and below the plate.

As shown, the tubular members 66 are removably supported in vertical positions on and around the turret 30 between the webs 33 thereof, with their lower ends resting in centering seats 69 secured to and arranged above the lower annular flange 32 of the turret, and with the upper portions retained against the forked jaws 61 by pairs of spring-urged fingers 70 carried by brackets 71 that are bolted to lugs 72 welded or otherwise fixed to the cylindrical hub portion 29. In such positions, the upper ends of the tubular members 66 extend above the work-supporting block 56 where the members have the necking-in operation performed thereto. During intermittent rotation of the turret, tubular members 66, after passing the stations of operations, are removed from the turret by applying an outward pull to the upper portions thereof against tension of the yieldable fingers 70 to disengage said members from around the clamping jaws 61 before slightly elevating the members to lift same out of the seats 69. Other tubular members are replaced for the removed ones before the turret is turned a sufficient distance to move unoccupied spaces to operation stations by merely inserting the lower ends of the tubular members in the seats 69 and forcing the upper portions between the spring-urged fingers 70 and around the clamping jaws 61.

Also bolted to and resting on the base plate 22 is a rigid platform 73 substantially semicircular in plan and extending around at least one half of the turret 30 at the location where the operation stations are arranged. The platform is of a fabricated construction and is composed of upper and lower horizontal plates 74 and 75, respectively, welded or otherwise connected to the upper and lower ends of a plurality of vertical plates 76 arranged to provide a wall substantially U-shaped in horizontal cross section by abutting and being welded to the sides of other vertical plates 77 that both radiate from said U-shaped wall and project inwardly of the wall for constituting reinforcing webs between the upper and lower plates 74 and 75. The upper plate 74 has the top surface thereof on the same horizontal plane as that of the top surface of the upper annular flange 31 of the turret 30 and has slidably mounted on said top surface movable clamping jaws 78 that cooperate with the different clamping jaws 61 on the turret during the dwell periods of the turret for securing the walls of the tubular members therebetween and rigidly supporting the tubular members during necking-in operations.

The movable clamping jaws 78, which are shown as four in number, are each on the same radial center lines as that of jaws 61 carried by the turret when the jaws 61 are in their dwelling positions. The jaws 78 are in the form of rectangular blocks slidably mounted on said radial center lines by guide bars 79 and centering keys 80 secured to the plate 74 of the platform. Also attached to the plate 74 outwardly of the jaws 78 and located on the same radial center lines are hydraulic motors 81 which are adjustably connected to the jaws 78, as at 82, and which control movement of the jaws toward and away from the bifurcated jaws on the turret. Secured to and projecting forward of each movable jaw block 78 is a pair of spaced centering pins 83 which enter into the openings in bushings 84 mounted in the eight faces of the work-supporting block 56 for aligning and holding the jaws 78 and 61 relative to one another and for locking the turret against turning movement while the movable jaws 78 are closed on the jaws 61 of the turret. On adjacent sides of pairs of movable jaw blocks 78 are attached switch-actuating bars 84 with a pair of oppositely arranged adjustable pins 85 on each for operating electric switches 86 on the plate 74 at opposite ends of the strokes of movement of the movable jaw blocks 78, the purpose of which will be set forth as the description proceeds. A removable hardened insert 87 with a semicircular work-engaging face 88 thereon is bolted to the forward portion of each movable jaw block 78 for engaging substantially half way around the outer surface of a tubular member 66 clamped by each movable jaw.

The ram 21 of the press, while being guided in its vertical reciprocatory motion by the pillars 18 of the press, is also guided against lateral movement relative to the turret 30 and the platform 73 by the stationary post 26 and by depending pins 89, respectively. On the underside of the ram 21 is mounted a plate 90 which in turn has bolted to its underside a die block 91 positioned directly above the four successive dwelling stations of the intermittent rotary turret 30 where the movable jaw blocks 78 operate. Through both the plate 90 and die block 91 are aligned openings to receive the reduced upper end 92 of the stationary post 26 when the ram is lowered, and in the opening in the die block is a bushing 93 in slidable engagement at all times with the reduced end 92 of the post. The depending guide pins 89, which are illustrated as being three in number, have their upper ends secured to the plate 90 and their lower ends projected downwardly through and slidable in bushings 94 supported in cylindrical housings 95 bolted on the upper side of the plate 74 of the platform 73.

Directly above each dwell station where a removable jaw block 78 is located, the die block 91 has a cylindrical opening 96 extending vertically therethrough in alignment with a tubular member 66 and into which is slidably mounted an outer combination necking-in and metal-working die 97 and an inner rigidly fixed metal-working die 98. Bolted against the plate 90 and received in the upper portion of each cylindrical opening 96 is a pair of flat disk-shaped members 99 and 99a between which is held an irregularly shaped head 100 of a downwardly directed sleeve pin 101 that extends through the disk 99a. Seated in the headed end of the sleeve pin 101 and backed up by the disk 99 is a similarly shaped but smaller head 102 of a pin 103 that extends downwardly through and below the lower end of the sleeve pin. On the pin 103 below the sleeve pin 101 is the inner metal-working die 98 which is of a construction similar to a collar and which is held tightly against the lower end of the sleeve pin 101 by locator 104 bolted to the lower end of the pin 103, as at 105, and presenting thereon a shoulder in engagement with the underside of the die 98. The locator 104, which is arranged on the center line of the die 98, enters a vertical opening 106 through an upper branch of a bifurcated clamping jaw 61 and an aligned opening 107 in a removable part 108 mounted on said branch and remains snugly fitted in the openings during operation of the die 98 for aiding in the support of the die against lateral movement. The removable part 108 is easily replaceable, and the opening 107 therein is accurately fitted to the diameter of the locator to assure stability of the die during operation thereof on the tubular member.

The outer combination necking-in and metal-working dies 97 that are slidable in vertical directions relative to the inner dies 98 are rigidly contained in die carriers 109 by being clamped between inwardly directed annular flanges of separate sections of the carriers, and it is the die carriers 109 with the dies therein that are slidably mounted in the lower portions of the cylindrical openings 96. An annular shoulder 110 provided on each die carrier 109 engages a stop ring 111 bolted to the underside of the die block to limit downward sliding movement of the carrier, while upward sliding movement is limited by abutment of the carrier against the disk 99a. To normally and yieldably retain the carriers in their lowermost positions, as shown in Figures 8 and 10, with the annular shoulders 110 against the stop rings 111, coil springs 112 in engagement with the ram 21 and pressing downwardly on the carriers 109 extend through aligned vertical openings 113 in the plate 90 and the pair of disks 99 and 99a.

Also on the ram 21 is secured the lower end of a vertical bar 114 that slides through a guide 115 attached to the superstructure 19 of the press frame upon vertical reciprocation of the ram. Fastened to the bar 114 for longitudinal adjustment therealong is a pair of oppositely directed lugs 116 and 117 adapted to engage and actuate, at the termination of up and down movement of the ram, the arms of a pair of electric switches 118 and 119 mounted on the superstructure 19. The switch 118 is operated when the ram is moved to its lower position, and the switch 119 is operated when the ram is moved to its upper position. These switches, like other electric switches 49, 50, 55, and 86 previously described, time the operations of hydraulic motors 20, 46, 51, and 81 used as power sources for operating the different mechanisms of the machine. While various ways may be employed to obtain a proper sequence of the machine operation, it is essential that the operation of the hydraulic motors 81 and 46 be timed so that the movable jaw blocks 78 operated by the motors 81 are in and remain in clamping positions on the turret 30 during operation of the motor 46 which disengages and re-engages the gear teeth 44 with the teeth of the rack 45.

From the preceding description of the form of invention illustrated, it is apparent that there are eight dwells of the turret in the making of a complete revolution, four of which are inactive stations, designated by the letters A, B, C, and D, and are used only for the removal of necked-in tubular members and the replacement of other tubular members to be necked in, and that the other four dwells are at stations E, F, G, and H where four different pairs of dies carried by the ram of the press are lowered on the upper ends of the tubular members simultaneously and effect operations upon the tubular members thereunder. At each dwell of the turret, the ram is lowered, and as the tubular members are advanced through the different stations E, F, G, and H, progressive re-forming operations to the tubular members are performed.

In Figures 11, 12, 13, and 14 are illustrated the relative sizes and shapes of the different pairs of dies 97 and 98 at the stations E, F, G, and H, respectively, which are designated 97e and 98e in Figure 11, 97f and 98f in Figure 12, 97g and 98g in Figure 13, and 97h and 98h in Figure 14, and from which it can be seen that the ends of the tubular members 66 are gradually reduced in diameter by the outer dies 97e, 97f, 97g and 97h as they progress through the different stations. The outer surfaces of the partially and fully re-formed shoulders 66a and cylindrical necks 66b of the tubular members 66 upon withdrawal of each pair of dies 97 and 98 therefrom will conform identically to the inside contours or shapes of the dies 97 withdrawn therefrom. Upon initial engagement of the dies 97 with the tubular members during downward movement of the ram 21, at the position shown in Figure 8, the dies 97 are momentarily stopped in their descension by the tubular members until they are engaged by the disk 99a. This dwell of downward movement permits the inner dies 98 to advance to positions relative to the dies 97, as shown in Figure 9, whereby closing in of the cylindrical necks 66b of the tubular members by the dies 97 are in arrear of the dies 98 as the ram continues to move downward.

After completion of downward movement and during the first ascending movement of the ram, the dies 97 remain in their most downward position by both friction and tension of the springs 112 until the shoulders 110 engage the stop rings 111. This has allowed the dies 98 to be moved upwardly into the most constricted necking-in portions of the dies 97, which is the position of parts as shown in Figure 10. Depending upon the inside diameters of the constricted portions of the die 97 relative to the outside diameters of the dies 98, the dies 97 and 98 may be used either as ironing dies to straighten out any irregularities in the necks 66b or may be employed as drawing dies for working the walls of the necks 66b to size and wall thickness during the remainder of upward movement of the ram.

In practice, it has been found that with the particular metal used in the construction of steering columns, together with the dimension requirements at different locations, satisfactory results have been obtained by applying an ironing action to the wall of the necks 66b to merely remove all unevenness of surfaces and provide for a true circular neck at the first three stations E, F, and G with the dies 97e and 98e, 97f and 98f, and 97g and 98g, and to apply a drawing action for working the metal in the wall of the neck to both inside and outside diameters at the final station H with the dies 97h and 98h. However, it may be found desirable to vary this particular procedure in the manufacture of similar and other types of tubular articles, and any changes made in the number of ironing and working operations used would be within the scope of the invention.

In view of the foregoing description taken in conjunction with the accompanying drawings, it is believed that a clear understanding of the construction, operation, and advantages of the apparatus will be quite apparent to those skilled in this art. A more detailed description is accordingly deemed unnecessary.

It is to be understood, however, that even though there is herein shown and described a preferred embodiment of the invention, various changes may be made without departing from the spirit and full intendment of the invention.

What is claimed is:

1. An apparatus for re-forming the ends of tubular members comprising in combination, a movable turret, means for moving said turret intermittently, means removably supporting tubular members on said turret, internal and external metal-working dies mounted adjacent said turret, means for simultaneously moving an internal and an external metal-working die into and onto the open end of each of a number of the tubular members on the turret to re-form the ends thereof during dwells of said turret, movable clamps positioned adjacent said turret and arranged for movement into and out of engagement therewith and tubular members removably supported thereby, actuating means timed in operation with movement of said turret for engaging and disengaging said clamps with said turret and tubular members during dwells of said turret, and means at the locations of engagement of said movable clamps with said turret for locking said turret against movement when it is engaged by said clamps.

2. An apparatus for re-forming the ends of tubular members comprising in combination, a rotatably mounted turret, a reciprocating power source, means connecting and disconnecting said power source with said turret during the strokes of the power source in opposite directions for intermittently rotating said turret, means removably supporting tubular members on said turret, internal and external metal-working dies mounted adjacent said turret, means for simultaneously moving an internal and an external metal-working die into and onto the open end of each of a number of the tubular members on the turret to re-form the ends thereof, during dwells of said turret, movable clamps positioned adjacent said turret and arranged for movement into and out of engagement therewith and tubular members removably supported thereby, actuating means timed in operation with operation of said turret for engaging and disengaging said clamps with said turret and tubular members while said turret is disengaged from said power source and metal-working operations are being performed on tubular members, and means for locking said turret against rotation when it is engaged by said movable clamps.

3. An apparatus for re-forming the ends of tubular members comprising in combination, an intermittently rotating turret, means removably supporting tubular members on said turret, stations around and at dwells of said turret to which the tubular members are successively moved, a ram movable toward and away from the open ends of the tubular members, means timed with movement of said turret for actuating said ram, dies mounted on said ram turret for simultaneously re-forming the ends of certain of the tubular members upon operation of the ram, clamping jaws carried by the turret and against which said tubular members are held by said means removably supporting the tubular members, other radially movable clamping jaws positioned adjacent said turret and arranged for movement toward and away from said first-mentioned jaws and into and out of engagement with the tubular members at stations where metal-working operations are performed, actuating means timed in operation with operation of said turret for engaging and disengaging said movable clamping jaws with said tubular members during dwells of said turret, and means for locking said turret against movement when said movable clamping jaws are in clamping position on tubular members.

4. The combination of claim 3 wherein said means removably supporting said tubular members on said turret includes seats in the form of sockets into which the ends of the tubular members not having re-forming operations performed thereon are received.

5. The combination of claim 3 wherein a single central supporting block rigidly secured to the turret backs up all of said first-mentioned clamping jaws against pressure of said second-mentioned radially movable clamping jaws.

6. An apparatus for re-forming the ends of tubular members that have openings in the cylindrical walls thereof comprising in combination, an intermittently rotating turret, means removably supporting tubular members on said turret, stations around and at dwells of said turret to which the tubular members are successively moved, a ram movable toward and away from the open ends of the tubular members, means timed with movement of said turret for actuating said ram, inner and outer dies mounted on said ram for simultaneously re-forming the ends of certain of the tubular members upon operation of the ram, clamping jaws carried by the turret extending through the openings in the tubular members and engaging the inside surfaces of the walls of the tubular members, said walls being held against said clamping jaws by said means removably supporting said tubular members, other clamping jaws movably positioned adjacent said turret and located at stations for clamping the walls of the tubular members between same and said first-mentioned clamping jaws during re-forming operations, and actuating means timed in operation with the operation of said turret for engaging and disengaging said second-mentioned movable clamping jaws with said tubular members during dwells of said turret.

7. The combination of claim 6 wherein an alignment locator is carried by each of said inner dies and each of said first-mentioned clamping jaws is provided with an alignment opening that snugly receives a locator during a re-forming operation.

References Cited in the file of this patent

UNITED STATES PATENTS

| | | |
|---|---|---|
| 2,174,967 | Cartwright | Oct. 3, 1939 |
| 2,387,698 | Yost | Oct. 23, 1945 |
| 2,535,339 | Woeller | Dec. 26, 1950 |
| 2,585,459 | Hahn et al. | Feb. 12, 1952 |